(12) United States Patent
Albach et al.

(10) Patent No.: US 7,802,954 B2
(45) Date of Patent: Sep. 28, 2010

(54) PLASTIC NUT WITH RETAINING ELEMENTS TO HOLD THE NUT IN A SOCKET OF A TOOL

(75) Inventors: Jens Albach, Hungen (DE); Lothar Schliessner, Linden (DE)

(73) Assignee: Newfrey LLC, Newark, DE (US)

( * ) Notice: Subject to any disclaimer, the term of this patent is extended or adjusted under 35 U.S.C. 154(b) by 115 days.

(21) Appl. No.: 11/858,290

(22) Filed: Sep. 20, 2007

(65) Prior Publication Data
US 2008/0075558 A1  Mar. 27, 2008

(30) Foreign Application Priority Data
Sep. 21, 2006  (DE) .................. 20 2006 014 695 U

(51) Int. Cl.
*F16B 23/00* (2006.01)
(52) U.S. Cl. .................. 411/408; 411/176; 411/188
(58) Field of Classification Search .................. 411/408, 411/429, 435, 176, 177, 182, 183, 185, 188, 411/372.5, 372.6, 430, 431
See application file for complete search history.

(56) References Cited

U.S. PATENT DOCUMENTS

| 4,281,699 A | * | 8/1981 | Grube ........................ 411/176 |
| 4,397,437 A | * | 8/1983 | Madej ........................ 248/72 |
| 5,176,050 A |   | 1/1993 | Sauer et al. |
| 5,246,323 A | * | 9/1993 | Vernet et al. .................. 411/29 |
| 5,340,257 A | * | 8/1994 | Morassutti .................. 411/512 |
| D363,657 S | * | 10/1995 | Kassardjian et al. ......... D8/354 |
| 7,296,382 B2 | * | 11/2007 | Sack ........................ 52/125.5 |

FOREIGN PATENT DOCUMENTS

| DE | 4101959 A1 | 8/1991 |
| DE | 100 48 975 | 7/2002 |
| DE | 10048975 C1 | 7/2002 |

OTHER PUBLICATIONS

European Search Report dated Aug. 21, 2009.

* cited by examiner

*Primary Examiner*—Gary Estremsky
(74) *Attorney, Agent, or Firm*—Michael P. Leary

(57) ABSTRACT

A plastic nut has raised regions forming retaining elements for retaining the nut in a socket of a tool. The retaining elements are formed at corners or faces of a polygonal tool engagement region. Tapered rib retaining elements may be formed at alternate corners, or wedge retaining elements may be formed at alternate faces.

3 Claims, 2 Drawing Sheets

PLASTIC NUT WITH RETAINING ELEMENTS TO HOLD THE NUT IN A SOCKET OF A TOOL

CROSS-REFERENCE TO RELATED APPLICATION

This application claims the benefit of German Utility Model Application No. 20 2006 014695.4 filed Sep. 21, 2006, incorporated herein by reference.

BACKGROUND OF THE INVENTION

This invention concerns plastic nuts, more particularly plastic nuts having a polygonal tool engagement region with a plurality of lateral faces for engagement with drive elements of a tool socket. The lateral faces may form an equilateral right prism, for example, with adjacent lateral faces meeting at longitudinal edges and forming corners. Nuts of this type may have hexagonal, octagonal, or square tool engagement regions, for example, with a central longitudinal bore for accommodating a stud. The bore may pass entirely through the nut or may be closed at one end in a nut known as a cap nut. Nuts of the prior art are disclosed, for example, in DE 693 00 210 D2 and DE 100 48 975 C1.

In the automotive industry, for example, nuts of the foregoing type are frequently screwed onto studs with motor-driven fastening tools equipped with a socket wrench, also called a driver, using a socket with a cavity matching the tool engagement region of the nut. Nuts with hexagonal tool engagement regions, and sockets with hexagonal or twelve-cornered inner surfaces are customary. It is desired that the nuts be easily inserted into the sockets, be held in the sockets frictionally without falling out, and be released from the sockets easily when desired.

BRIEF DESCRIPTION OF THE INVENTION

The present invention provides plastic nuts that meet the foregoing requirements and that are easily manufactured. For this purpose, the tool engagement region of the nuts is provided with outwardly projecting retaining elements at corners of the tool engagement region or at faces of the tool engagement region.

BRIEF DESCRIPTION OF THE DRAWINGS

The invention will be further described in conjunction with the accompanying drawings, which illustrate preferred (best mode) embodiments, and wherein.

DETAILED DESCRIPTION OF THE INVENTION

Figure 1:
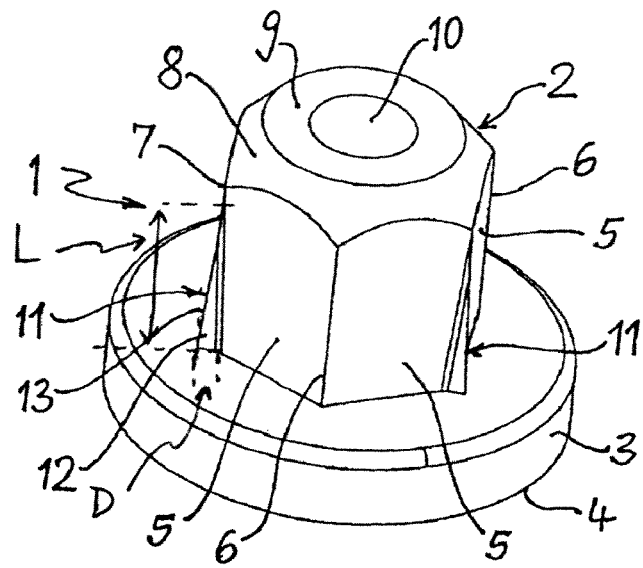
FIG. 1 is a perspective view of a nut according to a first embodiment of the invention.
Figure 2:
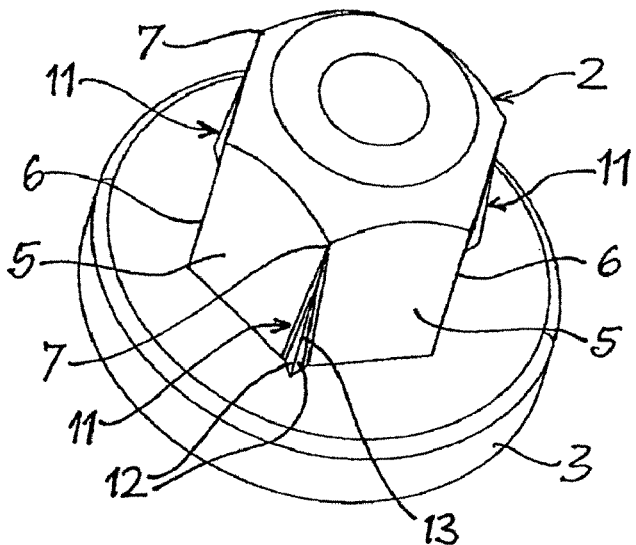
FIG. 2 is another perspective view of the nut of the first embodiment.
Figure 3:
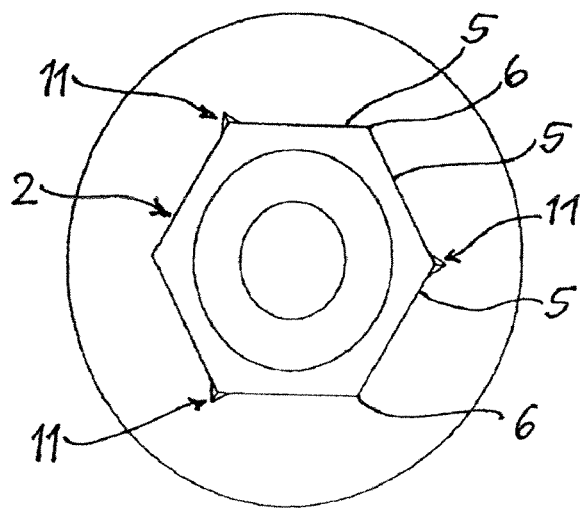
FIG. 3 is a top plan view of the nut of the first embodiment.

The nut 1 shown in FIGS. 1-3 is a plastic nut of the type known as a flanged nut. It may be formed of a single piece of thermoplastic or thermosetting material, by molding, for example. The nut 1 has a head 2 and a flange 3, with the underside facing away from the head 2 constituting a workpiece contacting surface 4. In the form shown, the head 2 is designed as a hexagonal prism with a polygonal tool engagement region having a plurality (e.g., six) of flat lateral faces 5 forming a hexagon. Adjacent faces meet at parallel longitudinal edges 6 or 7 forming corners.

The top end 8 of the nut facing away from the flange 3 is slightly domed with a central flat circular area 9. The top end of the nut is a leading end with regard to insertion of the nut into a socket of a tool, and the bottom end is a trailing end. A bore 10 passes longitudinally through the center of the nut. The inner walls of the bore may by threaded to mate with a threaded stud, or may be smooth and have threads formed therein when the nut is turned onto a threaded stud.

The longitudinal edges 6 alternate with the longitudinal edges 7. In the embodiment, edges 7 are provided with retaining elements 11 in the form of outwardly projecting wedge-shaped ribs, integrally molded with the faces 5. Each rib is defined by a pair of triangular surfaces 12.

The triangular surfaces 12 meet in longitudinal edges 13, preferably at an angle between 60° and 90°. Each rib 11 has a radially outward depth dimension D that increases progressively between the leading end and the trailing end of the nut. Each rib 11 also has a longitudinal length dimension L between its leading end and trailing end. At its maximum, proximate to the trailing end, depth D is significantly less than length L. Preferably, length L is at least twice the maximum depth D so that the ribs 11 have a slender shape with gently increasing outward depth D.

When the nut is inserted into a socket of a socket wrench, for example, having a 6- or 12-cornered socket cavity, the wedges of the ribs 11 enter corners of the cavity, and thereby frictionally secure the nut in the cavity. The slender shape of the ribs 11, with gently increasing outward depth make it possible to achieve the necessary retention force without substantially increasing the force required to press the nut into the socket.

The ribs 11 can deform elastically and/or plastically, thus making it possible to press the nut into the socket as far as the flange 3, if necessary. The arrangement of the retaining elements has the advantage of being equally effective in 6- and 12-cornered sockets. Excessive deformation of the retaining elements during tightening and fastening of the nuts is avoided, so that the socket can be easily removed from the fastened nut.

Figure 4:
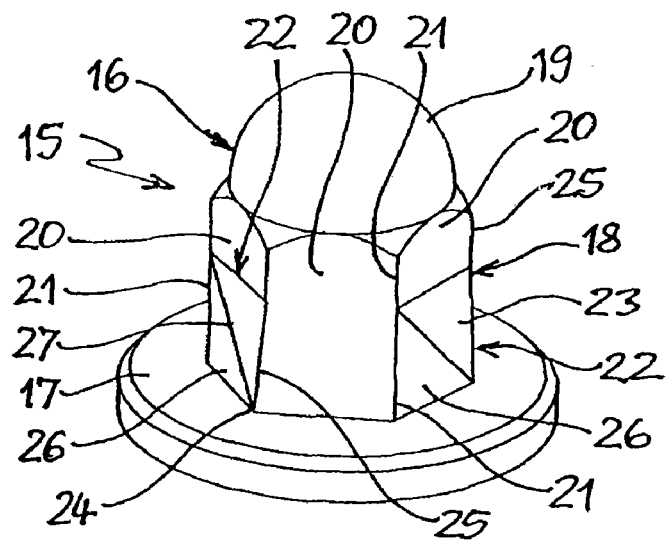
FIG. 4 is a perspective view of a nut according to a second embodiment of the invention.
Figure 5:
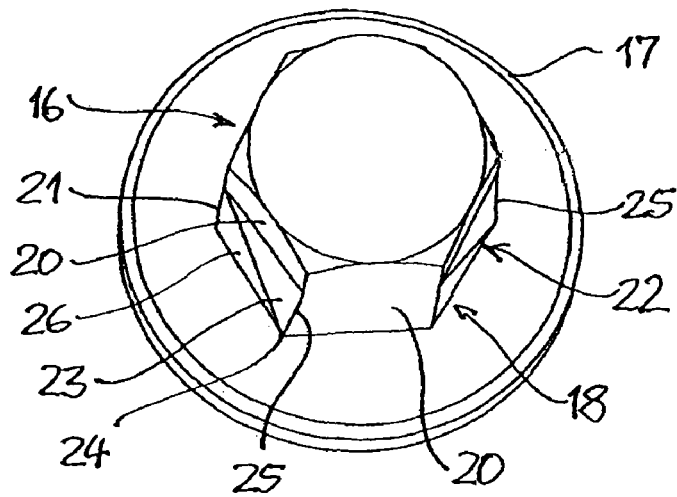
FIG. 5 is another perspective view of the nut of the second embodiment.
Figure 6:
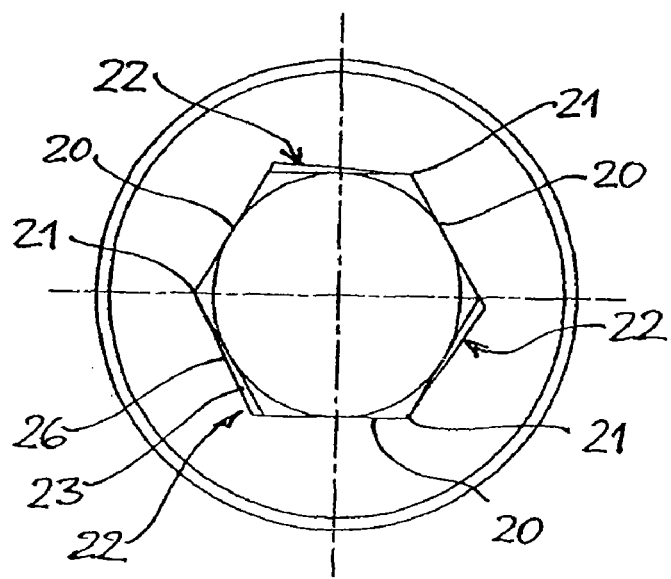
FIG. 6 is a top plan view of the nut of the second embodiment.

FIGS. 4-6 illustrate a second embodiment of the invention, in which a plastic nut 15 is in the form of a cap nut having a head 16 and a circular flange 17. The cap 19, facing away from the flange 17, is hemispherical. The tool engagement region 18 of the head 16 is hexagonal.

In the embodiment, the tool engagement region 18 has six flat lateral faces 20, adjacent faces meeting at six parallel longitudinal edges 21 and 25 forming corners. Every second lateral face 20 is provided with a retaining element in the form of a wedge-shaped outwardly raised area 22 in a lower region of the face adjacent to the flange 17. Each raised area 22 is bounded by a first triangular surface 23 and a second triangular surface 26. Surface 23 has a base side crossing the corresponding face 20 laterally, parallel to and at a distance from the flange 17, and has a vertex on the top of the flange at an edge 25. Surface 26 has a base side on the top of the flange 17 and a vertex at an edge 21 and at an end of the base side of the triangular surface 23. Triangular surfaces 23 and 26 have a common side 27 that extends diagonally across the corresponding face 20 from an edge 21 to an edge 25. The remaining sides of the triangular surfaces 23 and 26 merge with opposite longitudinal edges 21 and 25 of the corresponding face 20.

In the second embodiment, each raised area 22 forms a wedge-shaped retaining element, that starts at a level of approximately two-thirds of the height of a corresponding lateral face 20, has an outward projection that increases continuously as the wedge-shaped. retaining element approaches the flange 17, and has its greatest outward projection at an edge 25 located at the rear boundary of the raised area 22 when a nut is rotated clockwise. This shape of the retaining elements achieves a substantial contact length between the retaining elements and a socket and a substantial retention force to hold the nut in the socket. The large-area design of the retaining elements prevents excessive deformation, and reduces the possibility of jamming a nut in a socket after tightening. It is desirable that the greatest outward projection of the retaining elements be located in a region of the lateral faces that is subjected to the least load during tightening, so that the retaining elements are exposed to negligible deformation forces.

While preferred embodiments of the invention have been shown and described, changes can be made without departing from the principles and spirit of the invention, the scope of which is defined in the accompanying claims.

What is claimed is:

1. A plastic nut adapted to hold the nut in a socket of a tool, the nut comprising:
    a polygonal portion including a plurality of adjacent faces meeting at a plurality of longitudinal edges, the polygonal potion defining a longitudinal central bore; and,
    at least one outwardly projecting tapered rib formed on a corresponding longitudinal edge; and
    wherein the tapered rib is deformable by the tool socket in order to engage the socket and retain the nut in the socket when the nut is inserted in the socket, and
        the tapered rib includes a leading end and a trailing end and defines an axial length between the leading end and the trailing end;
        the tapered rib defines a radial depth and the radial depth of the of the rib increases from the leading end to the trailing end; and
        the maximum radial depth of the rib is significantly less than the axial length.

2. The nut of claim 1, wherein the rib is defined by triangular surfaces.

3. The nut of claim 2, wherein each tapered rib is located on alternating longitudinal edges of the polygonal section.

* * * * *